United States Patent [19]

Tobita et al.

[11] Patent Number: 4,609,805

[45] Date of Patent: Sep. 2, 1986

[54] WELD NUT WELDING APPARATUS

[75] Inventors: Hideaki Tobita, Toyota; Kazuo Naruse, Okazaki, both of Japan

[73] Assignee: Toyota Jidosha Kabushiki Kaisha, Aichi, Japan

[21] Appl. No.: 754,160

[22] Filed: Jul. 12, 1985

[51] Int. Cl.$^4$ .................. B23K 11/00; B23K 11/30
[52] U.S. Cl. ..................... 219/93; 219/119; 219/78.15
[58] Field of Search ............ 219/93, 78.01, 78.15, 219/78.16, 91.23, 86, 32, 119; 228/161; 10/72 R, 84; 29/34 B

[56] References Cited

U.S. PATENT DOCUMENTS

| | | | |
|---|---|---|---|
| 1,925,753 | 9/1933 | Fitch et al. | 219/93 |
| 2,265,561 | 12/1941 | Hoern | 219/93 X |
| 2,623,974 | 12/1952 | Prucha | 219/93 |
| 2,731,535 | 1/1956 | Grey | 219/119 |

FOREIGN PATENT DOCUMENTS 136466  7/1979  German Democratic Rep. ... 219/93

Primary Examiner—Clarence L. Albritton
Assistant Examiner—C. M. Sigda
Attorney, Agent, or Firm—Parkhurst & Oliff

[57] ABSTRACT

A weld nut welding apparatus includes upper and lower electrodes. A weld nut and a plate material which are to be welded together are clamped between the upper and lower electrodes, and a welding current is supplied to the weld nut and the plate material via these electrodes, whereby the weld nut is welded to the plate material. A groove is formed in that surface of the weld nut which abuts against the plate material, while a punch is provided inside the lower electrode, and the punch is moved toward the upper electrode after the welding operation, whereby it is possible for the plate material to be formed with a bore which corresponds to the groove. This bore is punched in the plate material only at a required welding position and at the same time as the welding operation. It is therefore possible to overcome the disadvantage that it would otherwise be necessary for a bore to be previously formed in the plate material. Thus, even if there is a change in the number of weld nuts which are to be secured to the plate material or the nut mounting positions on the plate material, it is possible for bores to be punched in the plate material at appropriate positions thereon, provided that nut welding positions alone are determined.

10 Claims, 4 Drawing Figures

WELD NUT WELDING APPARATUS

BACKGROUND OF THE INVENTION

1. Field of the Invention

The present invention relates to a weld nut welding apparatus. More particularly, the invention pertains to a weld nut welding apparatus capable of welding a weld nut to a plate material as well as forming a bore in the plate material after the welding operation, the bore being aligned with an axis of a bore in the weld nut.

2. Description of the Related Art

Referring first to FIG. 1, there is shown a conventional welding apparatus which is used to weld a weld nut to a panel employed as a plate material. A panel 3 which has previously been formed with a bolt receiving bore 1 for a weld nut in a pressing process is placed on a lower electrode 5 and properly positioned thereon. Thereupon, a guide pin 9 which is being biased upwardly by means of the compressed air supplied from an air inlet 7 which is provided in the lower electrode 5 projects upwardly from the bore 1 of the panel 3. In other words, the guide pin 9 enables the panel 3 to be properly positioned on the lower electrode 5. Then, a weld nut 11 is placed on the panel 3 while being guided by the guide pin 9 which projects from the panel 3, and the weld nut 11 and the panel 3 are pressed between an upper electrode 13 and the lower electrode 5 in such a manner as to be clamped therebetween. Thereafter, current is supplied to the weld nut 11 and the panel 3 from a known welding power source (not shown), whereby the weld nut 11 is welded to the panel 3. It is to be noted that the reference numeral 11a in FIG. 1 denotes a projection.

Thus, this type of conventional weld nut welding apparatus requires a bolt receiving bore to be previously formed in the panel. For this reason, even in the case of panels which are pressed by the use of the same die (referred to as "panels with the same configuration", hereinafter), for example, a panel which is employed as one constituent element of an automotive body, when the number of weld nuts required or the welding positions thereof differ for each of various types of vehicles, the following problems are experienced.

(1) It is necessary to change the number and positions of bolt receiving bores for weld nuts for each of various types of vehicles even for panels with the same configuration. In consequence, the number of required parts increases, and the number of pallets for required parts increases correspondingly, which fact leads to a reduction in the flexibility of the assembly line arrangement.

(2) To prevent such increase in the number of required parts, it may be possible to adopt a method in which panels with the same configuration have previously been formed in a pressing process with that number of bolt receiving bores which equals the largest number of bores respectively required for various types of vehicles, unnecessary bores being closed with grommets, or a method in which weld nuts are first welded at all the bores and then unnecessary nut bores are filled with a caulking material. However, employment of such methods disadvantageously involves a wasteful use of time in mounting grommets and an increase in cost as the result of providing additional grommets, or an increase in weight as the result of welding unnecessary nuts together with the risk of the quality of the finished panel being deteriorated by the existence of unnecessary bores.

SUMMARY OF THE INVENTION

Accordingly, it is a primary object of the present invention to provide a weld nut welding apparatus which is capable of welding a weld nut to a plate material as well as punching a bolt receiving bore in the plate material without any need to form a bolt receiving bore in the plate material beforehand.

To this end, the invention provides the following arrangement. Namely, a weld nut and a plate material which are the objects to be welded together are clamped between upper and lower electrodes, and a welding current is supplied to the weld nut and the plate material via these electrodes, whereby the weld nut is welded to the plate material. In this case, a groove is formed in that surface of the weld nut which abuts against the plate material, while a punch is provided inside the lower electrode, and the punch is moved toward the upper electrode after the welding operation, whereby it is possible for the plate material to be formed with a bore corresponding to the groove. This bore is punched in the plate material only at a required welding position and at the same time as the welding operation. It is therefore possible to overcome the disadvantage that it would otherwise be necessary for a bore to be previously formed in the plate material. Thus, even if there is a change in the number of weld nuts which are to be secured to the plate material or the nut mounting positions on the plate material, it is advantageously possible for bores to be punched in the plate material at appropriate positions thereon, provided that nut welding positions alone are determined.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 2:
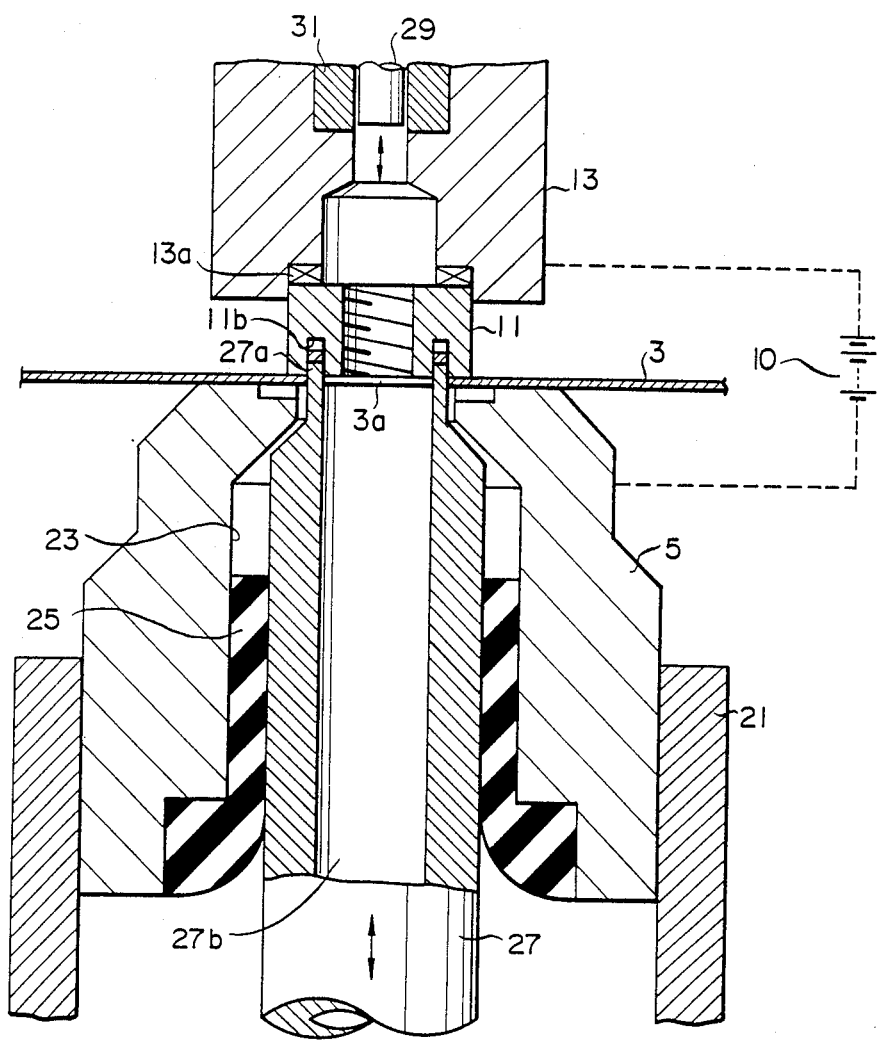
FIG. 2 is a sectional view of an essential portion of one embodiment of the weld nut welding apparatus according to the present invention.

Referring now to FIG. 2 which shows one embodiment of the weld nut welding apparatus according to the present invention, a lower electrode 5 is supported by a collar 21 which is in turn supported by the welding apparatus body (not shown). The lower electrode 5 has a cylindrical chamber 23 formed in the central portion thereof, the chamber 23 extending axially of the lower electrode 5. A cylindrical guide 25 of an insulating material is firmly fitted to the inner surface of the cylindrical chamber 23. A punch 27 is disposed inside the guide 25 in such a manner that the punch 27 is movable axially of the guide 25. The punch 27 is adapted to be movable vertically as viewed in FIG. 2 by means of an actuator (not shown). The shape of the distal end portion 27a of the punch 27 corresponds to the shape of a U-groove 11b which is cut in the bottom surface of a weld nut 11. Further, an axial bore 27b for removing a waste piece 3a produced as the result of punching the panel 3 is formed in the central portion of the punch 27.

An upper electrode 13 which is connected to a welding power source 10 is supported by a conveying and pressing device (not shown) in such a manner that the upper electrode 13 is able to press against the weld nut 11. The upper electrode 13 has an electromagnet 13a and therefore is able to attract the weld nut 11 by the action of the electromagnet 13a for the purpose of conveying the weld nut 11 onto a panel 3 placed on the lower electrode 5. The upper electrode 13 further has a pin 29 disposed in the central portion thereof, the pin 29 serving as a removing means which causes the waste piece 3a of the panel 3 produced as the result of punching by the punch 27 to drop into the bore 27b formed in the punch 27. The pin 29 is supported by a driving device (not shown) and moved vertically (as viewed in FIG. 2) by the latter while being guided by an insulating guide 31 which is provided in the upper electrode 13.

Figure 1:
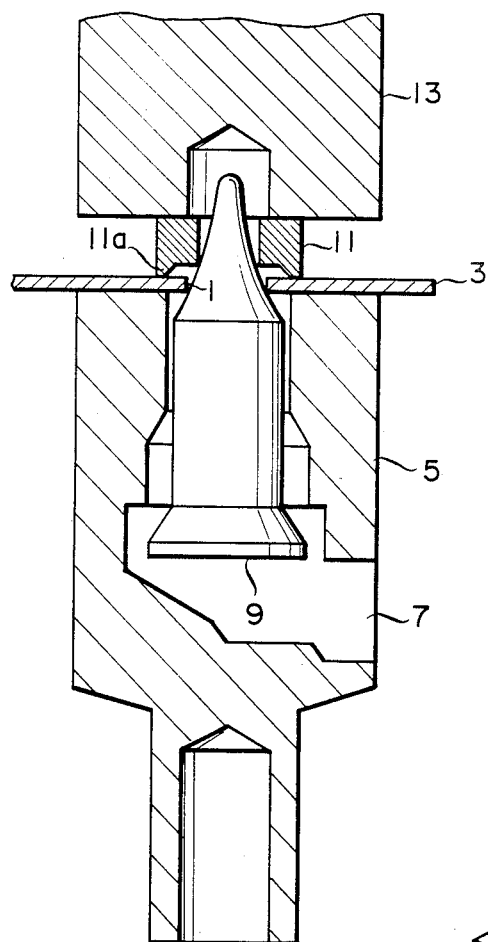
FIG. 1 is a sectional view of an essential portion of one example of a conventional weld nut welding apparatus.
Figure 3:
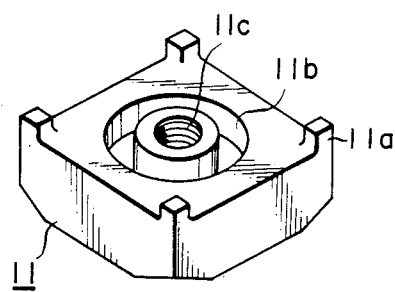
FIG. 3 is a perspective view of a weld nut employed in the welding apparatus shown in FIG. 2.

As to the weld nut 11, it is possible to use one which has a configuration such as that shown in FIG. 3. Referring to FIG. 3, the substantially cubical weld nut 11 has four projections (referred to as "legs", hereinafter) 11a, a ring-shaped U-groove 11b and a threaded portion 11c. The projections 11a are designed to melt in a resistance welding operation so as to weld the nut 11 to the panel 3, while the U-groove 11b is provided for the purpose of punching the panel 3 by means of the punch 27.

The weld nut welding method carried out by employing the welding apparatus shown in FIG. 2 will be described hereinafter with reference to FIG. 2.

The panel 3 is first conveyed above the upper electrode 5 by a conveyor means (not shown). After a predetermined positioning operation, the panel 3 is placed on the lower electrode 5. Next, the weld nut 11 is conveyed above the lower electrode 5 while being attracted by the electromagnet 13a of the upper electrode 13 and is then pressed, together with the panel 3, between the upper and lower electrodes 13, 5. While doing so, the weld nut 11 and the panel 3 which are the objects to be welded together are supplied with current from the welding power source 10 via these electrodes 5 and 13. In consequence, the legs 11a of the weld nut 11 are melted, and the weld nut 11 is thereby welded to the panel 3.

Thereafter, the supply of current to the objects of welding is cut off, and the punch 27 is pushed upwardly as viewed in FIG. 2, whereby the panel 3 is punched by the distal end portion 27a of the punch 27. More specifically, the punch distal end portion 27a has a ring shape which corresponds to the shape of the U-groove 11b formed in the weld nut 11, and as the punch 27 is moved upwardly, the punch distal end portion 27a enters the U-groove 11b, whereby the panel 3 is punched. The waste piece 3a of the panel 3 is dropped into the bore 27b formed in the punch 27 by the downward movement of the pin 29 in the upper electrode 13 caused by the driving device (not shown).

Figure 4:
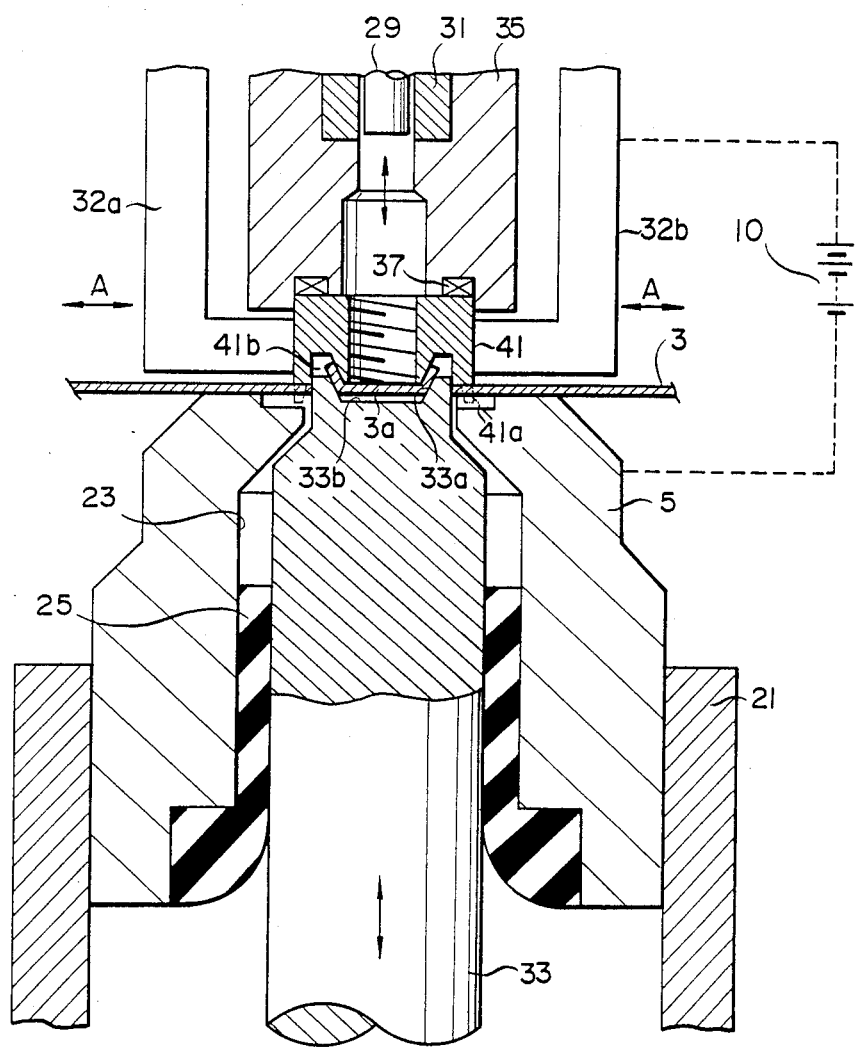
FIG. 4 is a sectional view of an essential portion of another embodiment of the weld nut welding apparatus according to the present invention.

Another embodiment of the weld nut welding apparatus according to the present invention will now be described with reference to FIG. 4. It is to be noted that, in the Figure, members or portions which are similar to those shown in FIG. 2 are denoted by the same reference numerals.

The lower electrode 5 which is supported by the collar 21 and the guide 25 are similar to those in the welding apparatus shown in FIG. 2. An annular projection 33a which has a tapered inner surface is formed at the distal end portion of a punch 33 which is guided by the guide 25. The shape of a recess 33b which is defined by the inner surface of the projection 33a is made complementary to the shape of a projection 41a which is formed on the bottom surface of a weld nut 41. More specifically, the inner periphery of the U-groove 41b is also formed with a tapered surface which is similar to the tapered surface of the recess 33b. The upper electrode of this embodiment is constituted by a pair of substantially L-shaped electrodes 32a and 32b which are respectively supported by driving devices (not shown). The electrodes 32a and 32b are movable by the driving devices in the directions of the arrows A, that is, to each side of the weld nut 41. The reference numeral 35 in FIG. 4 denotes an upper die serving as a press block which is supported by a weld nut conveying and pressing device (not shown). The upper die 35 has a weld nut attracting electromagnet 37 secured to its distal end. The upper die 35 is provided therein with the pin 29 which is moved vertically by the driving device (not shown) while being guided by the guide 31 in a manner similar to that of the pin 29 which is provided in the upper electrode 13 of the welding apparatus shown in FIG. 2. It is to be noted that it is not necessary for the guide 31 in this embodiment to be formed from an insulating material.

In the thus arranged welding apparatus also, the panel 3 is placed on the lower electrode 5 and the weld nut 41 is conveyed to a predetermined position on the panel 3 in a manner which is similar to that in the case of the welding apparatus shown in FIG. 2. The thus conveyed weld nut 41 is pressed by the upper die 35. Then, the pair of upper electrodes 32a and 32b are moved in the directions of the arrows A by the respective driving devices in such a manner as to clamp the weld nut 41 therebetween as shown in FIG. 4. Thereafter, the objects to be welded are supplied with current via the upper electrodes 32a, 32b and the lower electrode 5 such as to melt the legs 41a of the weld nut 41, whereby the weld nut 41 is welded to the panel 3. It is to be noted that the broken line 41a in FIG. 4 represents the legs of the weld nut 41, the legs 41a being melted at the time of welding.

After the weld nut 41 has been welded to the panel 3, the punch 33 provided inside the lower electrode 5 is moved upwardly while the weld nut 41 is being pressed, thereby punching that portion of the panel 3 which is surrounded by the U-groove 41b formed in the bottom surface of the weld nut 41. Then, the pin 29 is moved downwardly, thereby removing the punched panel piece 3a which is pressed to the bottom surface of the weld nut 41 as the result of the panel punching operation. Since the punched panel piece 3a in this embodiment is punched out in the shape of a disk, the force required for punching is favorably smaller than that required for annularly punching the panel 3 as in the case of the embodiment shown in FIG. 2.

Although the invention has been described through specific terms, it is to be noted here that the described embodiments are not exclusive and various changes and modifications may be imparted thereto without departing from the scope of the invention which is limited solely by the appended claims.

What is claimed is:

1. A weld nut welding apparatus comprising:
   an upper electrode;
   a lower electrode disposed such as to oppose said upper electrode;
   a plate material placed on said lower electrode;
   a weld nut placed such as to abut against said plate material at a welding position thereon, said weld nut having punch receiving means formed in the surface thereof which abuts against said plate material;
   a welding power source for supplying a welding current to said plate material and said weld nut which are clamped between said upper and lower electrodes via said electrodes, said welding current being of such a magnitude as to cause said weld nut to be welded to said plate material; and
   a punch adapted to move inside said lower electrode and toward said upper electrode such as to press said plate material into said punch receiving means, thereby punching a bore in said plate material, said bore corresponding to the shape of said punch receiving means.

2. A weld nut welding apparatus according to claim 1, wherein said punch receiving means is constituted by a groove.

3. A weld nut welding apparatus according to claim 1, wherein said punch has a passage formed therein for discharging a waste piece punched out of said plate material.

4. A weld nut welding apparatus according to claim 1, further comprising means for removing a waste piece produced as the result of punching said plate material by said punch.

5. A weld nut welding apparatus according to claim 4, wherein said removing means is constituted by a pin which is received in said upper electrode in such a manner as to be reciprocatable.

6. A weld nut welding apparatus according to claim 1, wherein said punch is formed at its distal end portion with a recess for receiving a waste piece punched out of said plate material.

7. A weld nut welding apparatus according to claim 1, further comprising a press block disposed adjacently to said upper electrode to cause said weld nut to directly abut against said plate material.

8. A weld nut welding apparatus according to claim 7, wherein said upper electrode is movable sidewardly of said weld nut.

9. A weld nut welding apparatus comprising:
   an upper electrode equipped with an electromagnet;
   a lower electrode disposed such as to oppose the electromagnet mounting surface of said upper electrode;
   a plate material placed on said lower electrode;
   a weld nut, having a threaded portion attracted by said electromagnet mounted on said upper electrode and placed such as to abut against said plate material, said weld nut having an annular groove formed in the surface thereof which abuts against said plate material;
   a welding power source for supplying a welding current to said plate material and said weld nut which are clamped between said upper and lower electrodes via said electrodes, said welding current being of such a magnitude as to cause said weld nut to be welded to said plate material;
   a punch provided in a cylindrical chamber which is formed inside said lower electrode such as to extend therethrough in such a manner that said punch is vertically movable through a guide, said punch having at its upper end an annular projection which presses said plate material toward said upper electrode and into said annular groove thereby to punch a bore in said plate material in correspondence with said annular groove, and said punch further having in its center a passage bore opened toward said annular projection such as to discharge a waste piece punched out of said plate material; and
   a pin opposing said passage bore and downwardly movable in said upper electrode, said pin pushing a waste piece punched out of said plate material into said passage bore by moving through the threaded portion of said weld nut.

10. A weld nut welding apparatus comprising;
    a press block equipped with an electromagnet;
    an upper electrode movable sidewardly of said press block;
    a lower electrode disposed such as to oppose both the electromagnet mounting surface of said press block and said upper electrode;
    a plate material placed on said lower electrode;
    a weld nut, having a threaded portion attracted by said electromagnet mounted on said press block and placed such as to abut against said plate material, said weld nut having an annular groove formed in the surface thereof which abuts against said plate material, said annular groove having a tapered inner peripheral surface, and said weld nut being contacted at its side surface by said upper electrode;
    a welding power source for supplying a welding current to said plate material and said weld nut which are placed on said lower electrode via said upper and lower electrodes, said welding current being of such a magnitude as to cause said weld nut to be welded to said plate material;
    a punch provided in a cylindrical chamber which is formed inside said lower electrode such as to extend therethrough in such a manner that said punch is vertically movable through a guide, said punch having at its upper end an annular projection which presses said plate material toward said press block and into said annular groove thereby to punch a bore in said plate material in correspondence with said annular groove, and said punch further having a recess surrounded by said annular projection, said recess having a tapered surface which corresponds to the tapered surface of said annular groove; and
    a pin opposing said recess and downwardly movable in said press block, said pin pushing a waste piece punched out of said plate material into said recess by moving through the threaded portion of said weld nut.

* * * * *